Figure 1:
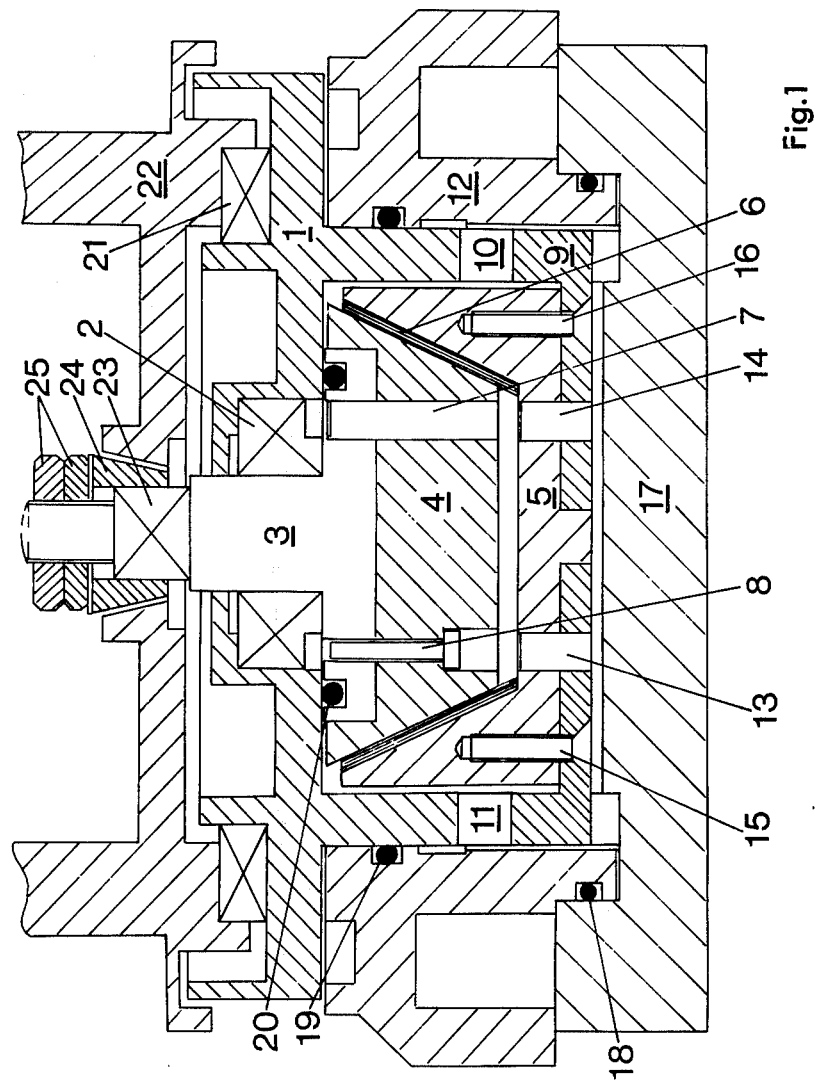

United States Patent [19]

Vinten

[11] 4,177,884
[45] Dec. 11, 1979

[54] DAMPING MECHANISMS

[75] Inventor: William P. Vinten, Hartest, England

[73] Assignee: W. Vinten Limited, Suffolk, England

[21] Appl. No.: 911,875

[22] Filed: Jun. 2, 1978

[30] Foreign Application Priority Data

Sep. 8, 1977 [GB] United Kingdom ............... 37485/77

[51] Int. Cl.² ............................................. F16F 15/20
[52] U.S. Cl. ................................. 188/290; 74/573 F;
308/26
[58] Field of Search ............. 74/573 F, 574; 188/1 B,
188/266, 290, 293; 248/22, 521; 308/26

[56] References Cited

U.S. PATENT DOCUMENTS

| | | | |
|---|---|---|---|
| 2,461,643 | 2/1949 | Hemmeter | 308/26 X |
| 2,614,896 | 10/1952 | Pierce | 188/1 B X |
| 3,101,979 | 8/1963 | Mard | 308/26 |
| 3,140,761 | 7/1964 | Doolittle | 188/290 |
| 3,861,503 | 1/1975 | Nash | 188/290 X |
| 3,877,552 | 4/1975 | Higginson et al. | 188/290 X |

FOREIGN PATENT DOCUMENTS 189553 10/1958 Sweden ................................... 188/1 B

*Primary Examiner*—Duane A. Reger
*Attorney, Agent, or Firm*—Larson, Taylor and Hinds

[57] ABSTRACT

The invention comprises an adjustable damping mechanism for such as pan and tilt heads comprising two or more mateable surfaces operating with lubrication wherein the pressure of one surface on the other is variable and combines solidity when stationary, drag proportional to velocity in movement up to whip pan velocity after which the drag remains substantially constant.

6 Claims, 1 Drawing Figure

DAMPING MECHANISMS

This invention relates to dampers and more particularly though not exclusively to rotary dampers of the type frequently used for damping or drag action on instrument support platforms suitable for rotation in the pan and/or tilt axis.

Damping mechanisms in the past have tended towards the use of fluids wherein movement of two or more concentric surfaces in the same plane relative to each other has caused the molecular shearing of the fluid therebetween. Maximum torque has, in these mechanisms, been dependent on the viscosity of the fluid, the area of the surfaces and the separation distance i.e. the molecular construction of the fluid and its resistance to change of shape. Very small clearances, or separation distances, increase torque but are difficult to obtain without the concentric surfaces touching.

One problem with some of the prior art type of friction dampers or fluid dampers is that of filling them with a thick lubricant. It is normal to perform this operation using a high pressure gun which usually forces the lubricant through, such as a grease nipple, until all air is expelled from a vent hole. The vent hole is then sealed as is the grease nipple. With the present invention this problem does not exist as the lubricant is more fluid and filling to capacity unnecessary.

Due to the fact the prior art dampers rely mainly on the molecular shear of the fluid for operation very little resistance to movement is encountered for very small angular movement about the null, for example, if used in the field of television, the cameraman may obtain a fairly steady transition during pan or tilt but when the subject is still and the camera being neither panned nor tilted, very little resistance is felt in the damper and any slight movement of the cameraman may be transmitted to the camera. If the damper is tightened, the drag when panning and tilting, becomes excessive with only marginal increase to the resistance of very small angular movements about the null positions. Furthermore if a whip pan is required, that is a rapid movement from one target to another in the pan axis, the damper has to be released before this may be achieved.

A head wherein the combination of stability when on target, stability when following a target and the ability to whip pan when necessary to transfer to a fresh target without necessary adjustments prior to the action is therefore required.

It is therefore an object of this invention to provide a damping mechanism wherein the aforementioned problems are considerably reduced.

According to the invention we provide a damping mechanism comprising at least in part, two or more mateable surfaces, wherein at least one of said mateable surfaces is substantially resistive to lubricants and at least one other of said mateable surfaces is substantially absorbent of lubricants, said two or more mateable surfaces being variably compressible one with the other to vary the degree of drag when said two or more mateable surfaces are moved in the same plane relative to each other and the degree of damping is proportional to the relative velocity of said two or more surfaces up to whip pan velocity.

According to a further aspect of the invention we provide a damping mechanism comprising at least in part, two or more mateable surfaces, wherein at least one of said mateable surfaces is substantially resistive to lubricants and at least one other of said mateable surfaces is substantially absorbent of lubricants, said two or more mateable surfaces being variably compressible one with the other to vary the degree of drag when said two or more mateable surfaces are moved in the same plane relative to each other and the degree of damping is proportional to the relative velocity of said two or more surfaces up to whip pan velocity and wherein frictional resistance is obtained between said two or more mateable surfaces when said two or more mateable surfaces are stationary.

According to a still further aspect of the invention we provide a damping mechanism comprising at least in part, two or more mateable surfaces, wherein at least one of said mateable surfaces is substantially resistive to lubricants and at least one other of said mateable surfaces is substantially absorbent of lubricants, said two or more mateable surfaces being variably compressible one with the other to vary the degree of drag when said two or more mateable surfaces are moved in the same plane relative to each other, and the degree of damping is proportional to the relative velocity of said two or more surfaces up to whip pan velocity wherein frictional resistance is obtained between said two or more mateable surfaces when said two or more mateable surfaces are stationary and wherein said two or more mateable surfaces will slip one on the other when the velocity of movement in the same plane relative to each other reaches that of whip pan.

The invention will now be described, by way of example only, in conjunction with the accompanying drawing which shows a cross section of a prefered example.

Referring to the drawing, a base (1) has a bearing (2), preferably a tapered bearing, with a shaft (3) journalled therein. A frusto-conical section of substantially lubricant resistant material (4) preferably of P.T.F.E. (Polytetra-fluoro-ethylene), or the like, of a P.T.F.E. or the like coated material, is concentrically attached to one end of shaft (3) for substantially mating engagement with a female frusto-conical section (5), the frusto-conical surface of which has a layer of compressible, substantially lubricant absorbent, material, such as NEBAR (Registered Trade Mark) or the like attached thereto. Locating means (7), such as dowels, and securing means (8), such as screws, provide the attachment means for the conical section (4) and shaft (3). A bar-nut (9) attached to the female frusto-conical section (5) and moveable along two slotted keyways (10) and (11) by rotation of a threaded adjusting ring (12) determines the amount of compression of the NEBAR (Registered Trade Mark) on the P.T.F.E. surface and hence the resistance to movement between the two surfaces when shaft (3) is rotated. Preferably the female frusto-conical section (5) is located on the bar-nut (9) by such as two dowel pins (13) and (14) and secured by such as two screws (15) and (16). A cover (17) may be secured, by such as screws, to the base (1). To provide a smooth movement between the two surfaces, the surfaces may be partially or wholly immersed in a lubricant reservoir and the lubricant may be retained within the operating area or reservoir by such as seals (18), (19) and (20).

To provide a greater degree of control over the resistance to movement between the mating surfaces the NEBAR (Registered Trade Mark) surface may be channelled thus reducing the contact surface area and increasing the lubrication of the mating surfaces as a greater surface area for lubricant absorption is available within the channels and compression of the abutments easier.

For use on such as a pan and tilt head used for supporting and controlling such as a camera, tracking aerial, or surveying instruments, the pan axis can be accommodated by utilising a thick cover (17) securable to such as a tripod and mounting the pan and tilt head, such as shown in the diagram, wherein a thrust race (21) supports the weight of a head (22) and the head is attached to the shaft (3) by such as a squared section (23), clamp (24) and nuts (25). For the tilt axis the cover (17) may be a thin plate and the shaft (3) may be attached to or be a part of the tilt pivots and the base (1) may be attached to or part of the main framework in which the tilt axis rotates.

To improve dispersion of the lubricant around the reservoir when the drag unit is in operation, holes may be drilled through the female frusto-conical section (5) and nut bar (9) to prevent a build up of lubricant.

With the system of the present invention friction between the two surfaces maintains the two surfaces in adherance when no intentional movement is taking place, the drag between the two surfaces provides a smooth resistive transition when following a moving subject and whip pan may be achieved, whereas, with fluid drag units quick changes in speed of rotation causes either build up of fluid drag and consequent excessive torque on a supporting tripod, or the like, or, the stress in the fluid caused by viscous shear may be high enough to break down the fluid layer and cause a fall-out in the damping rate.

By friction it is meant the resistance to movement between the two surfaces when the surfaces are stationary.

By drag it is meant the resistance to movement between the two surfaces when movement is made and is proportional to the relative velocity of the two surfaces.

By whip pan it is meant that the resistance to movement between the two surfaces does not increase when a sufficient relative velocity is reached above a given rate.

I claim as my invention:

1. A damping mechanism comprising at least a pair of mateable surfaces, one of said surfaces being substantially resistive to lubricants, the other of said surfaces being substantially absorbent of lubricants, said surfaces being in engagement, and means for varying the pressure of one of said surfaces on the other of said surfaces to vary the degree of drag so that when said two surfaces are moved in the same plane relative to each other the degree of damping is proportional to the relative velocity of said two surfaces up to a whip pan velocity.

2. A damping mechanism according to claim 1 wherein said surface resistive to lubricants is of polytetrafluoroethylene.

3. A damping mechanism according to claim 1 wherein said surface absorbent of lubricants is of Nebar.

4. A damping mechanism according to claim 1 and further including channels in said lubricant absorbent surface.

5. A damping mechanism according to claim 1 wherein said surfaces are of frusto-conical section.

6. A damping mechanism according to claim 5 and further including means in said frusto-conical sections for improved lubricant dispension.

* * * * *